(12) United States Patent
Vincenzi

(10) Patent No.: US 10,646,948 B2
(45) Date of Patent: May 12, 2020

(54) SYSTEM AND METHOD FOR APPLYING OF A COATING ELEMENT TO A BEARING SURFACE

(71) Applicant: Augusto Vincenzi, Rome (IT)

(72) Inventor: Augusto Vincenzi, Rome (IT)

(73) Assignee: EASY AUTOMATION S.R.L., Pomezia (IT)

( * ) Notice: Subject to any disclaimer, the term of this patent is extended or adjusted under 35 U.S.C. 154(b) by 481 days.

(21) Appl. No.: 14/422,242

(22) PCT Filed: Aug. 26, 2013

(86) PCT No.: PCT/IB2013/056891
§ 371 (c)(1),
(2) Date: Feb. 18, 2015

(87) PCT Pub. No.: WO2014/033612
PCT Pub. Date: Mar. 6, 2014

(65) Prior Publication Data
US 2015/0217394 A1     Aug. 6, 2015

(30) Foreign Application Priority Data

Aug. 27, 2012  (IT) .............................. RM2012A0422
Aug. 27, 2012  (IT) .............................. RM2012A0423

(51) Int. Cl.
*B23K 11/00*     (2006.01)
*H05B 3/84*      (2006.01)
(Continued)

(52) U.S. Cl.
CPC ........ *B23K 11/004* (2013.01); *B23K 11/0013* (2013.01); *B23K 11/06* (2013.01);
(Continued)

(58) Field of Classification Search
CPC ... B23K 11/0013; B23K 11/004; B23K 11/06; H05B 2203/011; H05B 2203/017; H05B 3/0009; H05B 3/84
(Continued)

(56) References Cited

U.S. PATENT DOCUMENTS 1,938,819 A * 12/1933 Eskilson ................. B23K 37/02
                                                         228/19
3,277,266 A * 10/1966 Blaszkowski ............ C21D 1/09
                                                         219/76.13
(Continued)

FOREIGN PATENT DOCUMENTS

DE         4307263 A1 * 9/1994  ........ B23K 11/0013
DE    10 2009 010840       9/2010
(Continued)

OTHER PUBLICATIONS

EP 1577046 A2.pdf.*
(Continued)

*Primary Examiner* — Dana Ross
*Assistant Examiner* — Ket D Dang
(74) *Attorney, Agent, or Firm* — Lucas & Mercanti, LLP

(57) ABSTRACT

System (2) for automatically applying a coating element (4) to a support surface comprises a heating device (1) for applying the coating element (4) along an application path of the support surface, by administration of heat obtained by the Joule effect, comprising a first electrode (5) and a second electrode (6) which can be connected to an electric power generator and are configured to form a part of an electric circuit, a portion of the coating element (4) being able to be arranged between the first electrode (5) and the second electrode (6), so as to close the electric circuit, such that the Joule effect heats the portion of the coating element (4) following a flow of current in the electric circuit, the overall (Continued)

configuration of the heating device being such that the first electrode (5) and the second electrode (6) are able to be moved with respect to the coating element (4) during application of the coating element (4) to the support surface, and an automatic movement device (3) being able to move the device (1) along a path for applying the coating element (4) to the support surface.

14 Claims, 7 Drawing Sheets

(51) Int. Cl.
*B23K 11/06* (2006.01)
*H05B 3/00* (2006.01)

(52) U.S. Cl.
CPC ............ *H05B 3/0009* (2013.01); *H05B 3/84* (2013.01); *H05B 2203/011* (2013.01); *H05B 2203/017* (2013.01)

(58) Field of Classification Search
USPC .... 219/76.17, 229, 223, 221, 230, 234, 243, 219/85.16, 85.1, 209, 210; 118/669, 679, 118/683, 684, 323, 712; 901/41–43; 228/212, 213, 32, 49.1, 49.5, 51; 439/55, 439/60, 68, 71, 78, 82, 571
See application file for complete search history.

(56) References Cited

U.S. PATENT DOCUMENTS

| | | | | |
|---|---|---|---|---|
| 3,277,267 A * | 10/1966 | Blaszkowski | ............ | C21D 1/09 148/224 |
| 3,542,999 A * | 11/1970 | Dudek | ................. | H05B 3/0009 219/155 |
| 4,572,937 A * | 2/1986 | Opprecht | ............... | B23K 11/06 219/81 |
| 4,653,362 A * | 3/1987 | Gerber | ..................... | B26D 7/08 219/221 |
| 4,724,294 A * | 2/1988 | Klein | ...................... | B23K 11/11 219/86.7 |
| 4,822,969 A * | 4/1989 | Yao | ...................... | H05B 3/0009 219/116 |
| 4,866,237 A * | 9/1989 | Inoue | ................. | B23K 11/0013 219/76.13 |
| 5,111,015 A * | 5/1992 | Riordan | ............... | B23K 11/163 219/118 |
| 6,673,468 B1 * | 1/2004 | Behr | ...................... | B23K 11/06 428/626 |
| 7,870,991 B2 * | 1/2011 | Okamoto | ............. | H05K 3/3436 228/103 |
| 2007/0151966 A1* | 7/2007 | Schwenke | ............... | B60S 1/586 219/203 |
| 2007/0175175 A1* | 8/2007 | Schwenke | ................ | H05B 3/86 52/745.19 |
| 2011/0262627 A1 | 10/2011 | Schwenke et al. | | |

FOREIGN PATENT DOCUMENTS

| | | | |
|---|---|---|---|
| EP | 1 577 046 | 9/2005 | |
| IT | 1577046 A2 * | 9/2005 | ........... B23K 1/0004 |
| WO | 2004/082934 | 9/2004 | |
| WO | 2007/075242 | 7/2007 | |

OTHER PUBLICATIONS

Int'l Search Report for PCT/IB2013/056891, four pages, dated Feb. 5, 2014.
Written Opinion for PCT/IB2013/0568591, seven pages, dated Feb. 5, 2014.
Int'l Preliminary Report on Patentability for PCT/IB2013/0568591 and PCT Article 34 claim amendments, 16 pages, dated Dec. 23, 2014.

* cited by examiner

SYSTEM AND METHOD FOR APPLYING OF A COATING ELEMENT TO A BEARING SURFACE

This application is the U.S. national phase of International Application No. PCT/IB2013/056891, filed 26 Aug. 2013, which designated the U.S. and claims priority to Italian Application No. RM2012A000422 filed 27 Aug. 2012, and Italian Application No. RM2012A000423, filed 27 Aug. 2012; the entire contents of each of which are hereby incorporated by reference.

FIELD OF THE INVENTION

The present invention relates to a device and a method for applying a coating element to a support surface by means of administration of heat, in particular by means of heat obtained by the so-called Joule effect.

More particularly, this invention relates to the application of conductive elements, so-called "busbars", onto plastic supports for manufacturing thermal windscreens and/or for manufacturing photovoltaic panels.

BACKGROUND OF THE INVENTION

In the motor-vehicle sector frequently filaments of metal are applied onto windscreens in order to ensure rapid defrosting in climatic conditions such as rain, snow or ice.

Generally, during the process for manufacturing windscreens, as in the manufacture of safety glass, it is envisaged bonding together two glass planes by means of a sheet of polyvinyl butyral (PVB).

In particular, during the manufacture of windscreens which incorporate conductive filaments, these filaments are applied onto the sheet of polyvinyl butyral before it becomes an integral part of the windscreen itself.

Usually the metal filaments positioned along straight paths parallel to each other are laterally confined by conductive strips, so-called "busbars", which are configured to distribute electric current in each of the filaments so as to ensure operation thereof.

In this sector, the operations of applying the busbars, are usually performed manually by an operator, with the metal strip usually being applied by means of a hot iron.

The manual operation performed by the operator is necessary to ensure the working accuracy and precision required during positioning of the element to be fixed onto the plastic support, in particular when applied along curved paths.

The main disadvantage of the manual system used in the prior art is that such manual application results in extremely high manufacturing costs both in terms of manufacturing time and in terms of labour.

A further disadvantage is the lack of reproducibility of the quality of the end product, a characteristic which is mainly dependent on the experience and skill of the operator who performed the application operation.

In particular, in operations involving the application of conductive elements onto plastic supports, insufficient heating of the joining zone may result in incomplete application of the element onto the support. Similarly, excessive heating may result in local deterioration of the plastic support with a consequent weakly set joint during cooling of the working zone.

Therefore, inadequate heating of the joining zone between conductive element and support surface gives rise, during quality control checks, to a large number of rejects.

SUMMARY OF THE INVENTION

The technical problem posed and solved by the present invention is therefore that of providing a device and method for applying coating elements, able to overcome the drawbacks mentioned above with reference to the prior art.

This problem is solved by a system capable of automatically applying a coating element to a support surface and a method for applying a coating element to a support surface by administration of heat obtained by Joule effect.

Preferred characteristic features of the present invention are defined in the dependent claims appended hereto.

According to its more general aspect the invention relates to a system which comprises a heating device, suitable for heating a portion of the coating element in a configuration where there is contact between the heating device and the portion of coating element, and automatic movement means, able to move the device along the path for application of the coating element to the support surface.

The invention achieves reproducibility of the degree of quality of the end product by means of automation of the displacement of the heating device. Advantageously, the invention reduces the number of production rejects due to the uncertain quality of the manual operations.

A further advantage of the present invention is that the presence of the automatic movement means reduces considerably the working time, making it possible for example to perform application of the coating at a speed of more than 300 mm/s compared to the maximum speed of 100 mm/s which can be achieved by means of manual operations.

Preferably, the invention also allows measurement of the quantity of power transferred during application of the coating element.

In a second preferred version, advantageously the invention allows adjustment and control of the electric power delivered to the heating device so as to ensure a constant administration of the heat.

In general terms, the invention allows automatic application of said coating elements in a highly controlled and reproducible manner.

Further advantages, characteristic features and the modes of use of the present invention will become clear from the following detailed description of a number of preferred embodiments thereof, provided by way of a non-limiting example.

BRIEF DESCRIPTION OF THE DRAWINGS

Reference shall be made to the figures of the accompanying drawings in which.

DETAILED DESCRIPTION OF PREFERRED EXAMPLES OF EMBODIMENT

As will be illustrated in greater detail further below, reference will be made to different preferred embodiments of the invention. All the embodiments achieve the same advantages mentioned above with reference to the system according to the invention, by means of the same technical solution of automatic application of a coating element to a support surface by means of heating obtained by the Joule effect.

Reference will be made below to the aforementioned preferred embodiments, using the same reference number to denote components which are substantially common to the different constructional forms.

Figure 2:
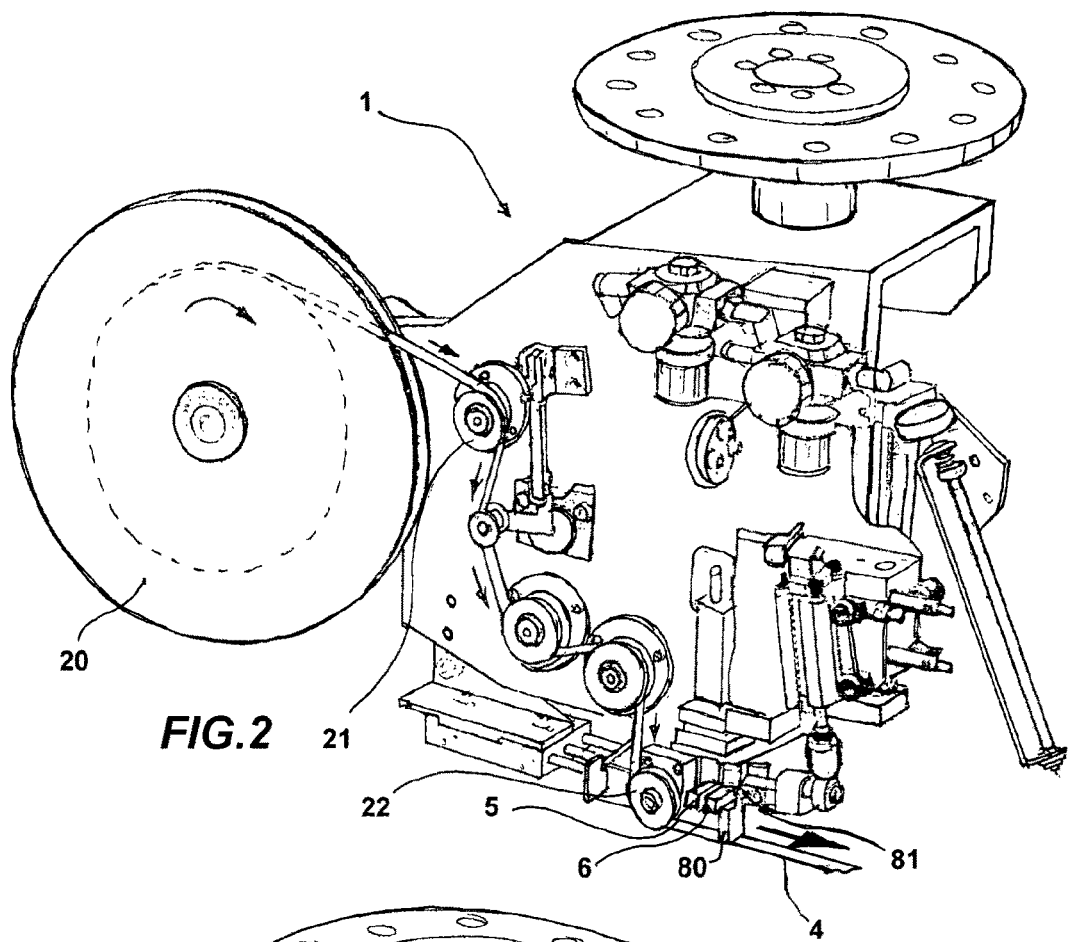
FIG. 2 shows a front perspective view of the heating device in a preferred embodiment of the system according to the present invention.

As shown in FIG. 2, a first preferred embodiment of the present invention concerns a heating device 1 for applying a coating element 4 to a support surface along an application path, by means of administration of heat obtained by the Joule effect. The heating device 2 according to the first preferred embodiment described here comprises a first electrode 5 and a second electrode 6 which can be connected to an electric power generator and are configured to form a part of an electric circuit in which a portion of the coating element 4 can be arranged between the first electrode 5 and the second electrode 6 so as to close the electric circuit and obtain heating by the Joule effect of the portion of the coating element 4 following a flow of a current in the electric circuit.

Moreover, the overall configuration of the heating device 1 is such that the first electrode 5 and the second electrode 6 are able to slide with respect to the coating element 4 during application of the coating element 4 to the support surface.

Advantageously, therefore, a relative movement of the electrodes and the coating element to be applied is envisaged.

The relative sliding of the first electrode and second electrode with respect to the coating element prevents any localized overheating both on the coating element and of the electrodes themselves. Application of the coating element therefore takes place at a substantially constant temperature.

In particular, the coating element 4 is made of conductive material.

Preferably, each electrode comprises an end for connection to the heating device 2 and a free end for contact between the electrode and the coating element 4 in which electric current flows.

In particular, each electrode has a substantially planar free end configured to interface, for example in an engaging configuration, with the coating element 4.

Measurement means 8, for example comprising a sensor, designed to measure the flow of current in at least one of the aforementioned electrodes, are positioned in the region of at least one of the aforementioned first electrode 5 and second electrode 6.

In the preferred embodiments described here, means are also provided for adjusting and controlling the flow of current in at least one of the aforementioned electrodes, said means being designed to allow delivery of a constant amount of power in the portion of the coating element 4.

In particular, during operation of the system according to the present invention, once contact has been established between the aforementioned first electrode 5 and second electrode 6 and the closing means of the electric circuit, a predetermined amount of power is delivered by the generator and measured on at least one of the two electrodes.

This amount of electric current flows in the electric circuit formed following engagement between the aforementioned first electrode 5 and second electrode 6 and the coating element portion 4 in which the aforementioned flow occurs.

In one embodiment of the device according to the present invention it is envisaged using rotating electrodes which are able to roll over the surface of the coating element 4 during the aforementioned relative sliding step.

In other words, the dynamic heating obtained by means of the Joule effect, with the electrodes making dynamic contact with the coating material, may be achieved by means of sliding electrodes or by means of rotating electrodes.

Figure 11:
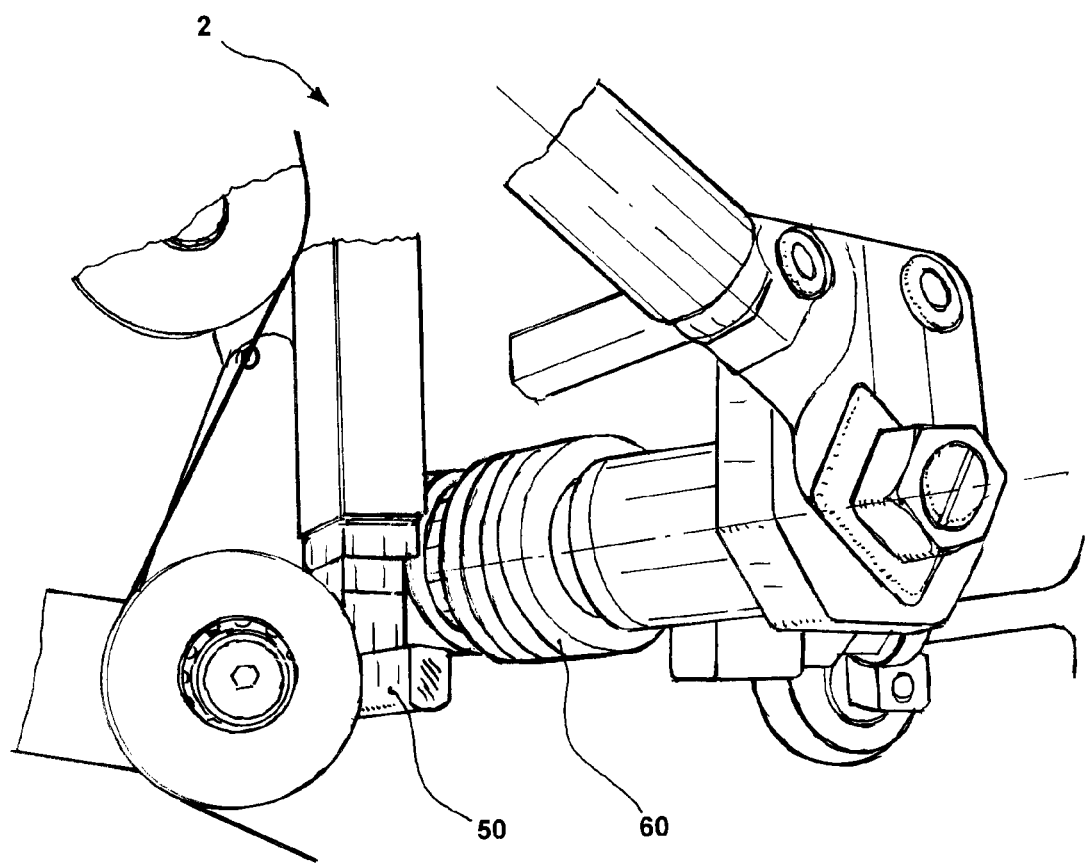
FIG. 11 shows a perspective view of a further preferred embodiment of the system according to the invention.

In a further preferred embodiment it is envisaged using a fixed electrode and a rotating electrode, the latter being in particular able to roll over the surface without sliding. This further embodiment, as shown in FIG. 11, is particularly advantageous. In particular, during use, in the region where there is contact between the rotating electrode and the coating element 4, the rolling friction present is able to reduce significantly the presence of dust and impurities which could be produced in the case of sliding friction.

Therefore, for example, the presence of a suction device, as described below, is not required in the region of the rotating electrode. Preferably, the rotating electrode is positioned, in the direction of welding travel, after the sliding electrode. In this way, advantageously, the rotating electrode manages to keep the busbar in position—as will be described more fully below—without having to provide a first statically welded portion.

Yet another embodiment envisages the presence of a first rotating electrode 5 and a second rotating electrode 6 which have a first and second axis of rotation substantially coaxial with each other, in particular the first and second axis of rotation being respectively substantially perpendicular to the welding path.

Advantageously, in such a configuration, during use, the current flow will take place in a direction substantially perpendicular to the desired application path. In particular, the current will pass through a section of the coating element where there is no frictional interaction with the electrodes. In this way the operating inefficiency due to the impurities generated by the friction between the electrodes and the coating element is reduced.

In particular, the electrodes are configured so as to be positioned, during welding of a strip-like coating element 4, respectively along the outer edges of the strip-like element.

Preferably, in all the embodiments described here, the device according to the present invention also comprises means 20, 21, 22, 23 for supporting and positioning a coating element 4, suitable for supporting and positioning the coating element 4 along the desired application path.

The aforementioned supporting and positioning means comprise, for example, a plurality of rollers which are rotatably mounted on a respective plurality of spindles attached to the heating device. The aforementioned rollers support the coating element, which has in particular a strip-like form, in the form of reels.

The coating element 4 may be unwound from a reel 20 for storing the strip-like element, said reel being for example removably attached to the heating device 2.

Preferably, each pin is able to be moved along its longitudinal axis in such a way as to allow a change in format of the strip-like coating element, in particular change of format of strip-like elements with different widths.

Figure 3:
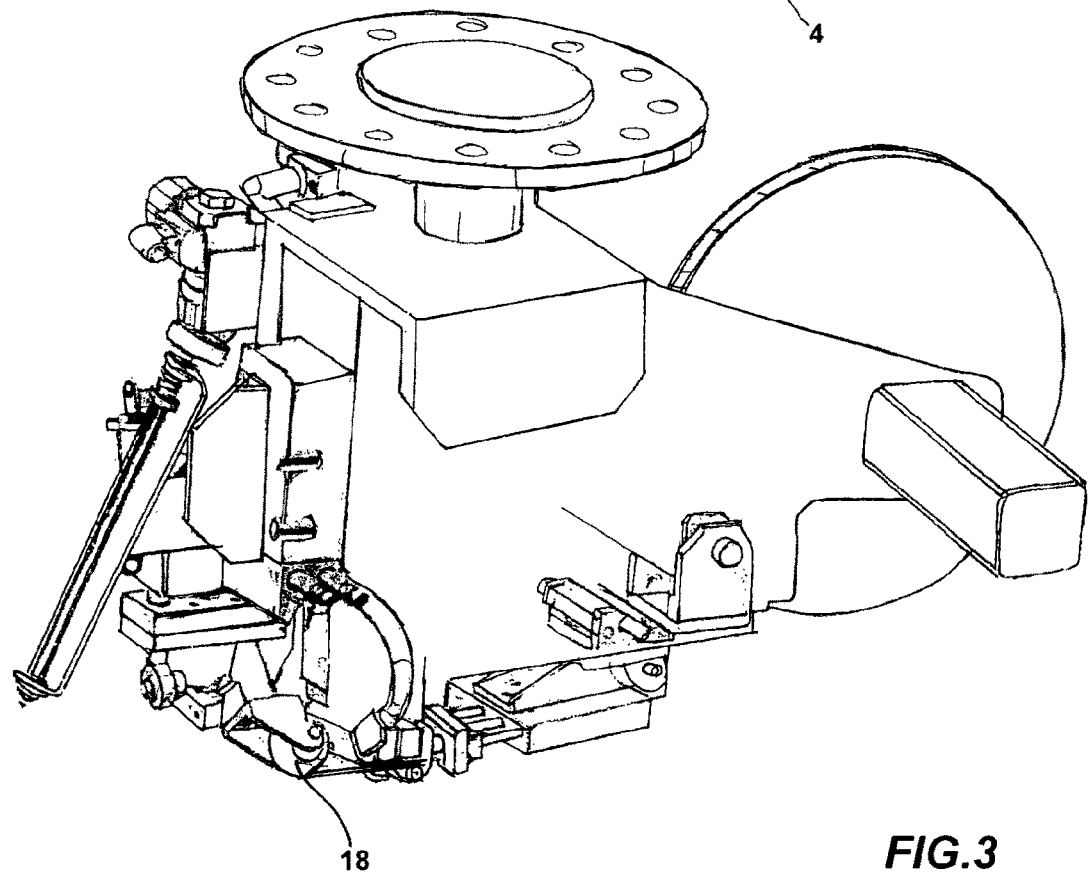
FIG. 3 shows a perspective view, from the rear, of the device according to FIG. 2.
Figure 4:
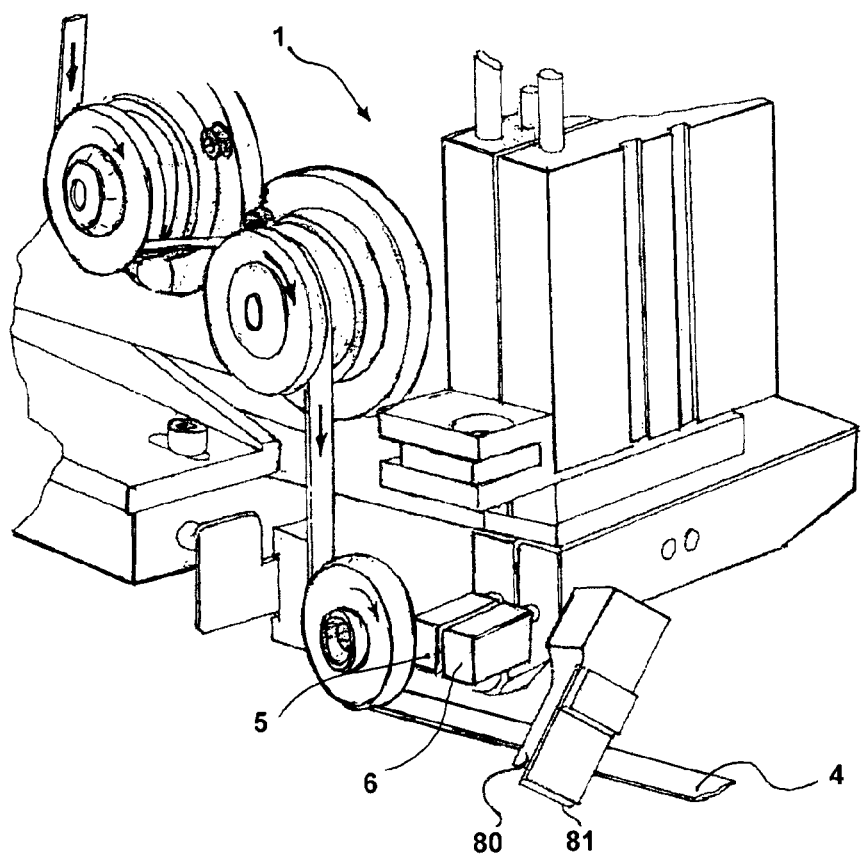
FIG. 4 shows a perspective view of a detail of the device according to FIG. 2.
Figure 5:
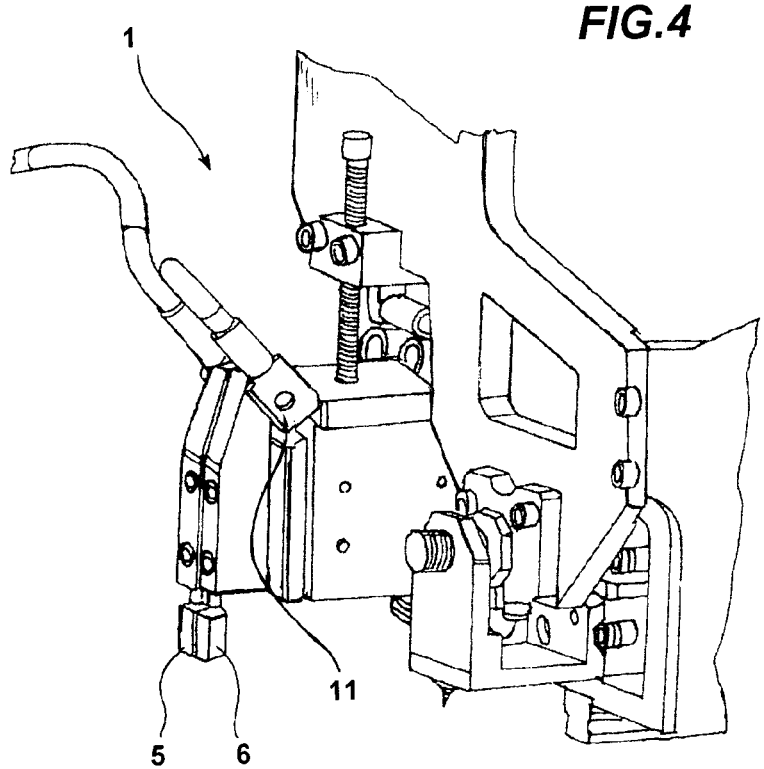
FIG. 5 shows a perspective view of a detail of the device according to FIG. 2.

In particular, as shown in FIGS. 2 and 3, the movement of the storage reel is produced by a motor, for example a brushless motor.

Figure 1:
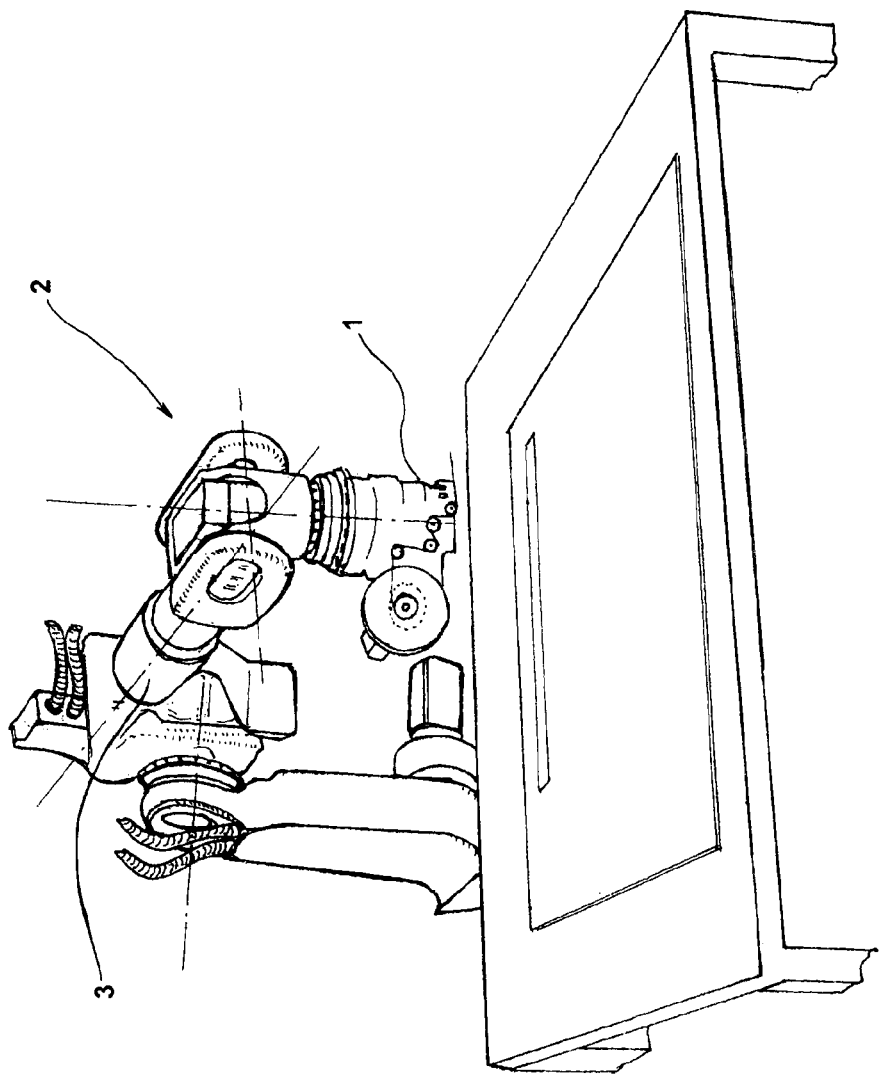
FIG. 1 shows a perspective view of a first preferred embodiment of the system according to the invention.

In a configuration during use, as shown in FIG. 1, a first portion of the coating element 4, partially unwound from the storage reel 20, is positioned on a plurality of drive elements—for example at least a first drive wheel 21 and second drive wheel 22—which are suitably positioned and adjusted to obtain a desired degree of tensioning of the strip-like coating element 4 in the zone where it is applied onto the support surface.

In particular, as shown in the figures, the second drive wheel 22 is positioned in an end zone of the heating device 2, for example in a zone of the device 2 designed to make contact with the coating element 4 in an operating condition of the device 1.

In a configuration during use of a preferred embodiment of the system according to the present invention, the coating element 4 is kept in position by means of a retaining element 80. In particular, this retaining element comprises a suction mouth configured to retain a portion of the coating element 4 by means of application of a vacuum.

In an alternative embodiment, not shown in the figures, the aforementioned element 80 comprises a plurality of contact needles for retaining the coating element with respect to the support surface.

In an alternative embodiment it is envisaged using a sucker element 80.

In particular, the device 1 according to the embodiments described here also comprises an element 81 for cutting the coating element 4.

For example, the cutting element is formed as a blade 81, preferably connected to the retaining element 80, so as to perform cutting of the coating element 4, in particular during use at the end of a first coating operation.

In particular, in order to keep the coating element portion tensioned, for example following the aforementioned cutting operation, a locking element positioned in a configuration where it makes support contact against the second drive wheel 22 is provided.

Figure 8:
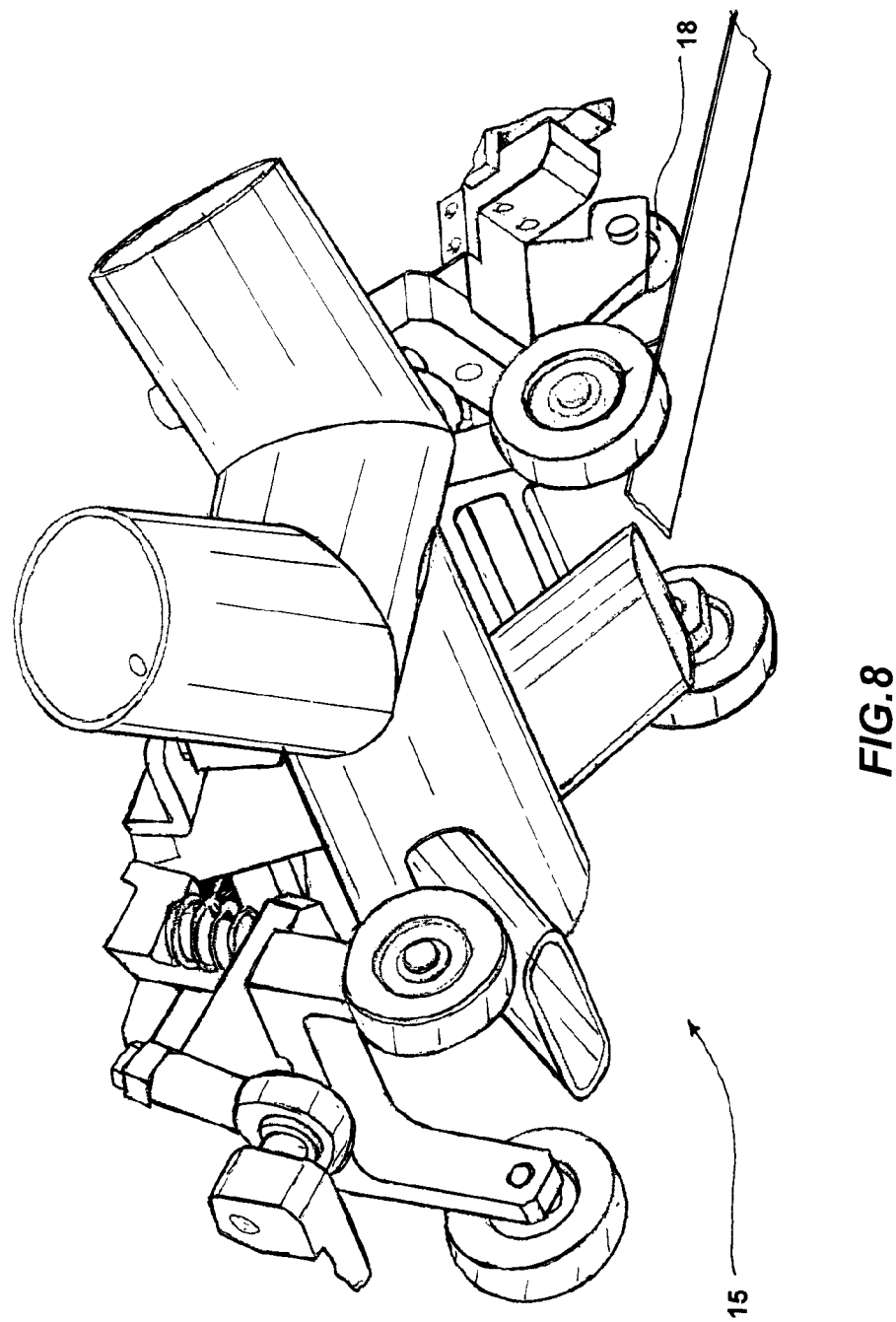
FIG. 8 shows a perspective view, from below, of a further detail of the system according to FIG. 1.

In the first preferred embodiment described here, the device 1 according to the invention also comprises suction means 15 configured to remove by means of suction any residues present on the coating element 4. In particular, these suction means 15, as shown in FIG. 8, comprise two suction mouths positioned relative to each other so as to remove by means of suction, from different angles, any impurities from the surface of the coating element 4.

For example, the aforementioned impurities comprise residual material which forms on the surface of the coating element following interaction between the electrodes and the coating element during dynamic contact.

Preferably, the suction means 15 are attached to the heating device 1 so that they may be moved, together with the device 1, above the coating element 4.

In particular, the suction device 15 is supported above the coating element 4 by revolving elements, for example wheels, which in particular may be adjusted heightwise with respect to the coating 4 so as to allow positioning of the suction mouths at an optimum suction height.

In the first embodiment described here, the device 1 according to the invention also comprises positioning means able to move the aforementioned first electrode 5 and second electrode 6 from a lowered operating configuration, in which the first electrode 5 and second electrode 6 are able to interact with the coating element 4, into a raised configuration, in which the first electrode 5 and second electrode 6 are able to interact with a cleaning element 30.

In particular, the aforementioned movement takes place in a plane substantially perpendicular to the application path of the coating element 4.

In a raised cleaning position, the electrodes are positioned in a direction substantially perpendicular to the direction of use and in particular any traces of contaminating material are removed from the surfaces of the connecting ends suitable for interacting with the coating element 4.

Figure 10:
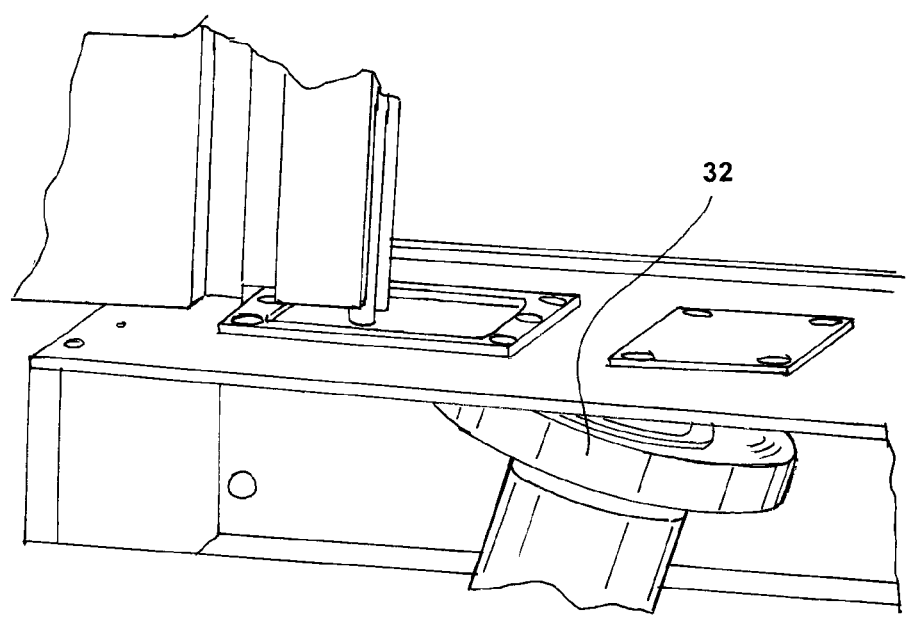
FIG. 10 show a schematic cross-sectional view of the cleaning device according to FIG. 9 in an operating configuration.

These positioning means are also envisaged in the aforementioned further embodiment, in particular for allowing positioning of the sliding electrode in a direction substantially perpendicular to the direction of use as described above. As shown in FIG. 10, the cleaning element 30 comprises for example a brush 32 preferably made of brass.

Figure 9:
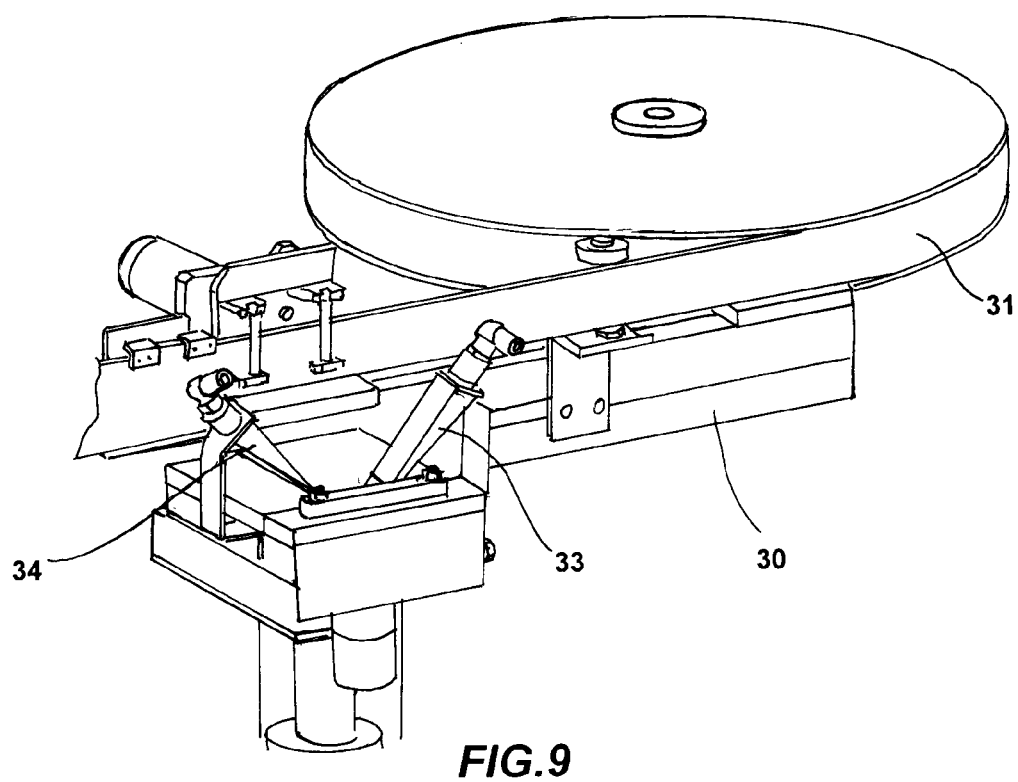
FIG. 9 shows a front perspective view of a device for cleaning the heating device according to FIG. 2.

For example, the zone of interaction between electrodes and brush is enclosed inside a suction chamber from which any residual impurities are removed by means of suction mouths 33 and 34, as shown in FIG. 9.

The cleaning device 30 also comprises an abrasive belt 31.

The abrasive belt 31, in the same way as the brush 32, interacts with the contact ends of the first electrode 5 and second electrode 6 for removal of impurities, for example produced during use, i.e. during sliding of the first electrode 5 and second electrode 6 with respect to the coating element 4.

In all the preferred embodiments described here, the system 2 according to the present invention comprises a heating device 1 and automatic movement means 3 able to move the device 1 along the path where the coating element 4 is applied to the support surface.

In particular, the aforementioned automatic movement means 3 comprise a robotic arm, for example a robotic arm of a six-axis robot.

In the first preferred embodiment it is also envisaged applying pressure on the coating element 4. In particular, the pressure on the coating element 4 is exerted by the same first electrode 5 and second electrode 6, for example during the aforementioned heating operation.

Preferably, the system 2 according to the present invention also comprises a revolving element 18, for example a pressure roller, configured to apply a fixing pressure on a portion of the coating element 4. In particular, the revolving element 18 is positioned so as to act on the coating element 4 after the aforementioned first electrode 5 and second electrode 6.

The pressure exerted by the revolving element 18 on the coating element 4 may be in addition to or instead of the pressure exerted by the first electrode 5 and second electrode 6.

In a second preferred embodiment, the heating device 10 according to the present invention comprises a first electrode 50 and second electrode 60 which can be connected to an electric power generator and which are configured to form a part of an electric circuit. The heating device 1 also comprises means 7 for closing the aforementioned electric circuit, which can be arranged between the aforementioned first electrode 50 and second electrode 60 and are made of conductive material so as to obtain heating by means of the Joule effect of an external surface of the closing means following a flow of current in the electric circuit. Advantageously, the closing means 7 are able to slide with respect to the coating element 4 during application of the coating element onto the support surface.

In particular, the aforementioned closing means comprise a member 7 configured to be arranged between the aforementioned first electrode 50 and second electrode 60 and having a plate-shaped form, for example of small thickness.

Preferably the member 7 is made of metallic material.

In particular, the aforementioned conductive member 7 is made of a refractory metallic material, for example molybdenum.

In the second embodiment described here, the free end of each electrode is suitably shaped so as to ensure contact between each electrode and the conductive member 7.

A point-like shape of the free end of the electrode allows, for example, a point-like contact. Alternatively, the contact between each electrode and the conductive element 7 is planar or spherical, for example in the case of a form-fit between the free end of the electrode and the conductive member 7.

In particular, the same conductive member 7 comprises a portion shaped so as to accommodate a form-fit with a free end of the aforementioned first electrode 50 and second electrode 60.

Preferably, in this configuration each electrode is connected independently to the main body of the heating device 2 by means of a system for adjusting the contact height, for example by means of an elastic member positioned at the connection end of each electrode.

In particular, an elastic member, for example a spring, suitable for allowing any substantial vertical movements of the electrode, is provided at the point where each electrode is connected to the heating device 2. This elastic member is configured so as to ensure continuous contact of the free end of each electrode with the conductive member 7, in particular during sliding of the conductive member 7 on the coating, thus compensating for any roughness or unevenness of the support surface.

During use, heating of the conductive member 7 is produced by the flowing of current across the contact zone between the electrodes and the conductive member 7, in particular by the resistance of the contact zone between electrodes and conductive member 7.

The transfer of heat from the conductive member 7 to the support surface depends on the temperature reached by the member 7 and on the extension of the actual contact zone between the member 7 and the support surface. In particular, in order to obtain substantially constant and uniformly distributed transfer of heat, the two contact surfaces between which heat exchange occurs must be substantially planar.

Advantageously, as a result of the configuration of the heating device 1 according to the second preferred embodiment of the present invention, the contact of the conductive member 7 may be automatically adapted to the support surface, thereby increasing the efficiency of the heat transfer.

This adaptive capacity is determined both by the possibility for vertical movement of each electrode and by the substantially point-like contact between the free end of each electrode and the conductive member 7.

Advantageously, therefore, there exists an ample capacity for adapting the conductive member 7, in particular while heating, during use of the heating device 1.

Figure 6:
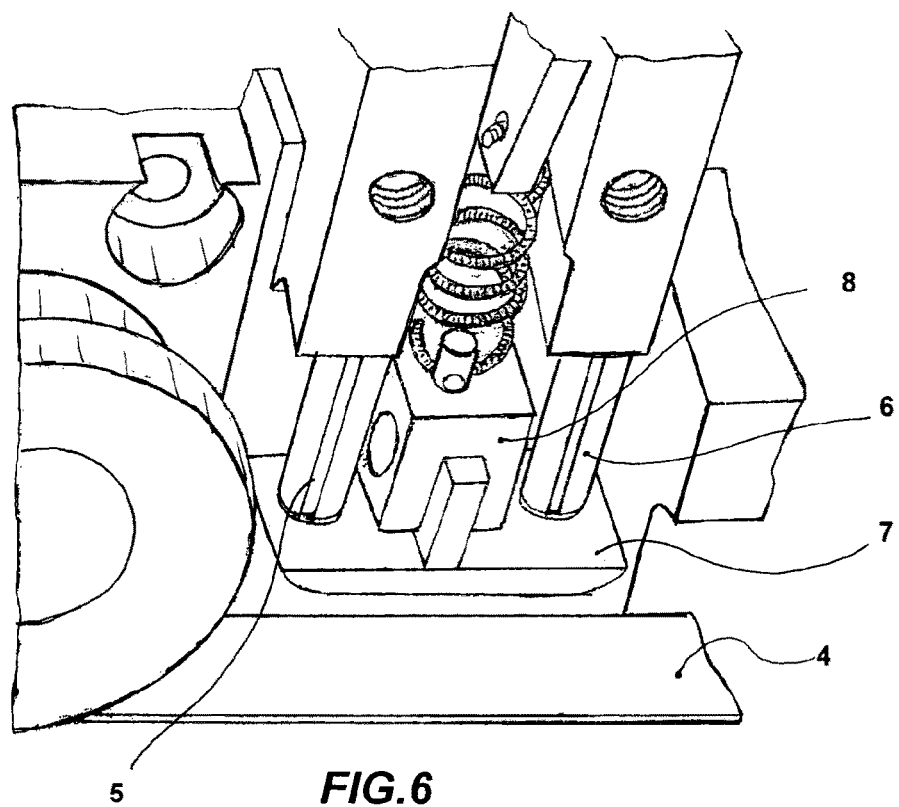
FIG. 6 shows a perspective view, from above, of a detail of a second preferred embodiment of the device according to the invention.

As shown in FIG. 6, the conductive member 7 has a substantially curved form at a first and second end of a surface of the conductive member 7, designed to face the coating element 4.

This curved form allows a reduction in the frictional forces during relative sliding of the conductive member 7 and the coating element 4.

In particular, the conductive member 7 is made of material with an electrical resistance less than the electrical resistance of the coating element 4.

In this way, during an operating condition, namely during a condition where there is contact between the conductive member 7 and the coating element 4, the electric current flows in the electric circuit formed following engagement between the aforementioned first electrode 50 and second electrode 60 and the conductive member 7.

In particular, in this operating condition, at least 90% of the current delivered passes through the conductive member 7 and only a small percentage, for example, passes through the coating element 4.

The conductive member 7 has a socket portion, in particular suitable for connection with measurement means 8, for example a temperature sensor, designed to measure the temperature value of the conductive member 7. In the embodiment described here, as shown in FIG. 6, a thermocouple 8 is arranged in position, for example above an upper surface between the aforementioned contact zones, in order to measure the temperature value of the conductive member 7.

Figure 7:
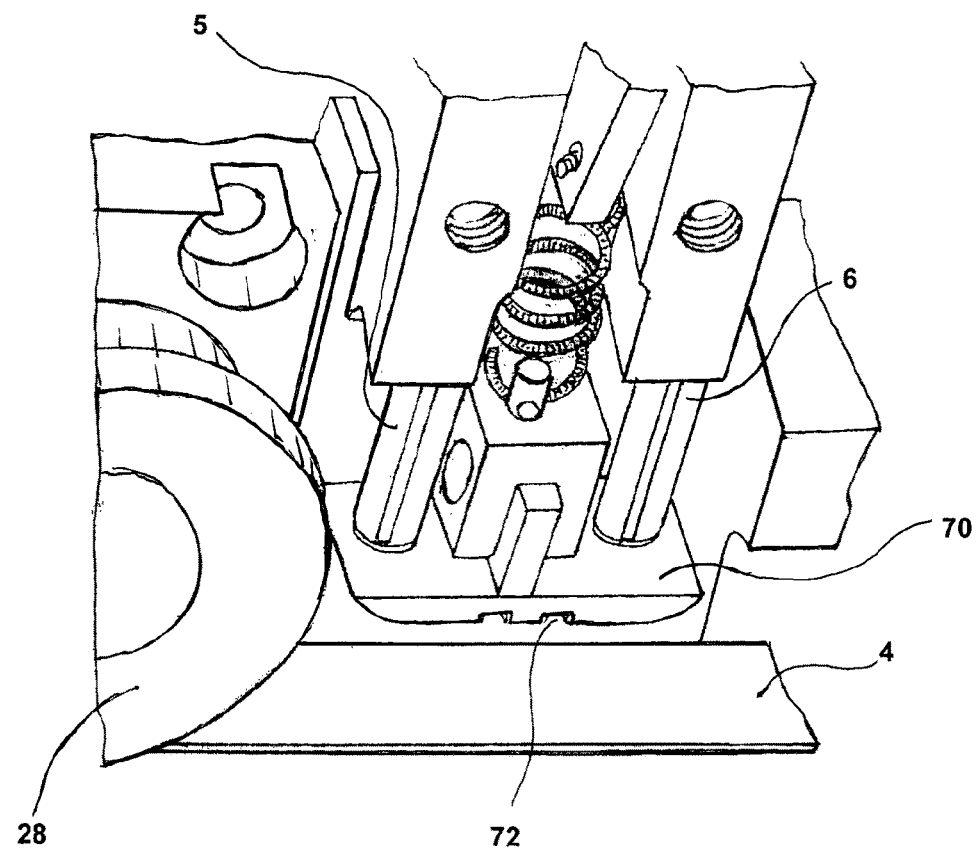
FIG. 7 shows a perspective view, from above, of a detail of an alternative embodiment of the device according to FIG. 6.

In a further embodiment, the conductive member 7 has at least one discontinuous zone on the surface designed to face the coating element 4. In particular, as shown in FIG. 7, the aforementioned discontinuous zone comprises at least one undercut portion 72, formed in particular by stock removal.

This undercut portion 72 allows, in particular during operation of the heating device 1, more rapid cooling of the conductive member 7 due to an increase in the surface area of the member 7 in contact with the air.

In particular, in a static operating condition where there is contact between the conductive member 7 and the coating element 4, the undercut portion 72 allows the flow of an air current between the contact surfaces and prevents excessive overheating thereof. In the case of static operation of the heating device 1, it is envisaged that there is no sliding of the heating system 1 with respect to the coating element 4, but only contact between the conductive member 7 and the coating element 4, located in a specific zone where the coating element 4 is fixed to the support surface.

With reference to both the first and the second embodiments described here, the heating device 1 according to the present invention comprises means for controlling and adjusting the voltage applied to the electrodes.

By means of these control and adjusting means it is possible to administer to the heating device 1 the amount of electric power needed to supply the amount of heat necessary for fixing the coating element 4 to the support surface.

For example in the first embodiment described here, with said means the power required may be set. The system, based on the resistance encountered in the circuit, is able to adjust the voltage or current values so as to achieve the desired aim.

In particular, in the second embodiment described, said means may be used to set the temperature of the conductive member 7. The system, depending on the temperature variations detected, for example via the thermocouple 8, is able to adjust the voltage or current values so as to achieve the desired aim.

Advantageously, the heating device 1 according to the second preferred embodiment of the present invention allows application of a coating element 4 made of non-conductive material. Moreover, extension of the contact surface area between the conductive member 7 and the support surface allows use thereof also for the application of flexible connectors, such as those used in Kapton electronics.

As regards operation of the heating device 1 according to the present invention, in all the preferred embodiments described here the device may be moved towards the support surface for application of a coating element 4.

With reference to the aforementioned preferred embodiments the main operating steps of the heating device 1 will be described below.

During a configuration of use of the heating device 1 according to the first embodiment, the free ends of the first electrode 5 and second electrode 6 are positioned opposite the coating element 4 and heating of the coating element 4 is performed following a flow of current in the coating element itself.

In particular, in the case where the coating element is made of conductive material and is in contact with the first electrode 5 and second electrode 6, heating of the external surface of the portion situated between the two electrodes occurs as a result of the Joule effect following a flow of current in the portion of the coating element 4.

During delivery of electric power to at least one of said first electrode 5 and second electrode 6, said delivery is monitored and adjusted so as to administer a constant amount of power to said first electrode 5 or second electrode 6. In particular, the aforementioned monitoring and adjustment step is performed during relative sliding of the aforementioned first electrode 5 and second electrode 6 with respect to the coating element.

In the heating device 10 according to the second embodiment, each first electrode 50 and second electrode 60 is in contact with the aforementioned closing means, for example a conductive member 7 which is engaged with the coating element.

Advantageously, the conductive member 7 is heated independently via a contact resistance between the first electrode 5 and second electrode 6 and the conductive member 7.

In this case, adjustment of the desired heating is performed less effectively than in the aforementioned case; it is therefore preferable to operate in such a way as to keep the temperature of the conductive member 7 constant. In other words, in this case the power output by the conductive member 7 is detected and an amount of current which compensates for the power output is delivered so as to keep the energy balance of the conductive member 7 constant.

During delivery, monitoring and adjustment of the electric power delivered is also performed so as to administer a constant amount of power to the aforementioned closing means 7 so as to ensure constant administration of the heat to the coating element.

In particular, in the second embodiment described here, the closing means 7 are able to slide with respect to the coating element 4 during application of the coating element 4 onto the support surface.

For example, the monitoring and adjustment step is performed during relative sliding of the aforementioned closing means 7 with respect to the coating element 4.

An operator will be able to adjust the parameters, such as the sliding speed of the electrodes or the power delivered, depending on the specific characteristics in each case, for example the type of material of the support surface or the type of material of the coating element.

In some embodiments described here, before moving the heating device 2 along the path for application onto the support surface, an initial step involving fixing of a first portion of the coating element 4 is envisaged. During the initial step it is in fact important to fix a first portion of the coating element by means of the heating device 1 preferably in a static configuration, by performing firstly heating as described above and then cooling thereof in order to ensure that bonding has taken place.

In the first embodiment heating of the first portion is performed only along the portion situated between the two electrodes; as soon as current delivery to the electrodes is stopped, the cooling step starts, said step being able to be speeded up for example by means of an air jet.

In the second embodiment described above, cooling of the heated portions is performed less effectively than in the preceding case and therefore forced-air cooling is envisaged.

In both cases, fixing of this first portion therefore allows the following step of sliding the heating device 2 on the support surface in order to apply the coating element 4.

In particular, the subsequent restoration of the initial temperature conditions in the zone where the coating element 4 and support surface are joined together results in fixing of the coating element 4 to the support surface.

Advantageously, in the further embodiment described above, this step of fixing a first portion is not necessary, since the bond between the layers to be welded is ensured by the configuration of the device itself.

In particular, owing to the presence of the rotating electrode, it is possible to speed up the processing time and move the device along the welding path keeping the busbar in position.

In fact, the frictional force which occurs between the support surface, for example made of plastic, and the metallic coating element, is greater than the revolving frictional force between the free end of the rotating electrode and the metallic coating element. The greater frictional force generates greater cohesion between the contact surfaces which therefore reduces significantly the possibility of displacement of the busbar from the desired welding path.

The present invention has been described hitherto with reference to preferred embodiments. It is understood that other embodiments relating to the same inventive idea may exist, as defined by the scope of protection of the claims which are provided hereinbelow.

The invention claimed is:

1. A system for automatically applying a continuous strip-like, coating element to a support surface having a fixed position comprising:
   a heating device configured to apply the coating element along an application path of the support surface, by administration of heat obtained by Joule effect, said heating device comprising:
   a first electrode and a second electrode,
   said first and second electrodes being connectable to an electric power generator and configured to form a part of an electric circuit, a portion of the coating element being able to be arranged between said first electrode and said second electrode so as to close said electric circuit so as to obtain heating by the Joule effect of the portion of the coating element following a flow of current in the electric circuit; and
   an automatic movement device;
   wherein the overall configuration of said heating device is such that said first electrode slides and said second electrode rolls with respect to the coating element during application of the coating element to the support surface, said first and second electrodes making dynamic contact with the coating element, said automatic movement device being configured to slide said first electrode and roll said second electrode along the application path for applying the coating element to the support surface during application of the coating element;

wherein said first electrode is a sliding electrode and said second electrode is a rotating electrode, wherein said rotating electrode has an axis of rotation at right angles to said application path, said second electrode extending in a direction parallel to the support surface; and wherein said system further comprises an elastic member positioned in a region of said first electrode and said second electrode and is configured to ensure continuous contact of a free end of said first electrode and said second electrode with a closing device of said heating device.

2. The system according to claim 1, further comprising means for measuring the flow of current in at least one of said first electrode and said second electrode.

3. The system according to claim 1, further comprising means for adjusting and controlling the flow of current in at least one of said first electrode and said second electrode, designed to allow delivery of a constant amount of power in a portion of the coating element which closes the electric circuit.

4. The system according to claim 1, further comprising means for supporting and positioning the coating element, suitable for supporting and positioning the coating element along the application path.

5. The system according to claim 1, further comprising suction means configured to remove by means of suction any residues on the coating element.

6. The system according to claim 1, further comprising an element for cutting said coating element, configured to define a cutting surface at longitudinal ends of the coating element.

7. The system according to claim 1, wherein said automatic movement device comprises a robotic arm.

8. A method for applying a continuous strip-like, coating element to a support surface by administration of heat obtained by Joule effect, comprising the steps of:
(a) providing a system according to claim 1, said system comprising a heating device;
(b) moving said heating device towards the support surface for applying the coating element;
(c) delivering electric power to at least a first electrode or a second electrode of the heating device; and
(d) monitoring and adjusting said delivery of electric power so as to administer a constant amount of power to said first electrode or said second electrode;

wherein said first electrode and said second electrode being moved to slide with respect to said coating element during application of the coating element to the support surface.

9. The method according to claim 8, wherein said monitoring and adjustment step is performed during a relative movement of said first electrode and said second electrode with respect to said coating element.

10. The method according to claim 9, wherein said movement comprises a rotation of at least one of said first electrode and said second electrode with respect to said coating element.

11. A system for automatically applying a continuous strip-like, coating element to a support surface, comprising:
a heating device for applying the coating element along an application path of the support surface, by administration of heat obtained by Joule effect, said heating device comprising:
a first electrode and a second electrode configured to be connected to an electric power generator and are configured to form a part of an electric circuit, said heating device comprises a closing device of said electric circuit, which is arranged between said first electrode and said second electrode and is made of conductive material, so as to obtain heating by means of the Joule effect of an external surface of said closing device following a flow of current in the electric circuit, wherein said closing device is able to slide with respect to the coating element during application of the coating element to the support surface; and
an automatic movement device;
wherein said automatic movement device is configured to slide said first electrode and roll said second electrode along the application path for applying the coating element to the support surface during application of the coating element to the support surface;
wherein said first electrode is a sliding electrode and said second electrode is a rotating electrode, wherein said second electrode has an axis of rotation at right angles to said application path, said second electrode extending in a direction parallel to the support surface; and
wherein said system further comprises an elastic member positioned in a region of said first electrode and said second electrode and is configured to ensure continuous contact of a free end of said first electrode and said second electrode with said closing device.

12. The system according to claim 11, wherein said closing device is made of refractory metallic material.

13. The system according to claim 11, wherein said closing device comprises a plate-shaped member configured to be arranged between said first electrode and said second electrode.

14. The system according to claim 13, wherein said plate-shaped member comprises a portion configured to accommodate a form-fit with a free end of said first electrode and said second electrode.

* * * * *